United States Patent

[11] 3,633,826

| [72] | Inventor | Slade H. Baker<br>Mankato, Minn. |
|---|---|---|
| [21] | Appl. No. | 8,629 |
| [22] | Filed | Feb. 4, 1970 |
| [45] | Patented | Jan. 11, 1972 |
| [73] | Assignee | T. Robert Burnight<br>Battle Creek, Mich.<br>a part interest |

[54] LAWN SPRINKLER
8 Claims, 3 Drawing Figs.

[52] U.S. Cl...................................................... 239/229,
239/276, 239/602, 239/DIG. 1
[51] Int. Cl...................................................... B05b 3/00
[50] Field of Search............................................ 239/229,
276, 602, DIG. 1, 519, 522, DIG. 12

[56] References Cited
UNITED STATES PATENTS

| 3,325,102 | 6/1967 | Araujo | 239/229 |
| 2,599,678 | 6/1952 | Walker | 239/276 X |
| 3,006,558 | 10/1961 | Jacobs | 239/276 X |
| 2,930,531 | 3/1960 | Kennedy | 239/229 |

*Primary Examiner*—Lloyd L. King
*Assistant Examiner*—Edwin D. Grant
*Attorneys*—Williamson, Palmatier and Bains, George F. Williamson, H. Dale Palmatier and Herman H. Bains

ABSTRACT: A lawn sprinkler comprised of only an elongated, tubular body threaded on at least one end thereof for connection to a hose, a ground engaging support means on said body, and a flexible discharge tube removably attached to an outlet fitting on the top of the tubular body. The flow of pressurized water through the discharge tube, preferably an 8 to 10 inch length of rubber tubing, causes the flexible discharge tube to rapidly rotate through an arcuate path to thereby distribute water in an even pattern.

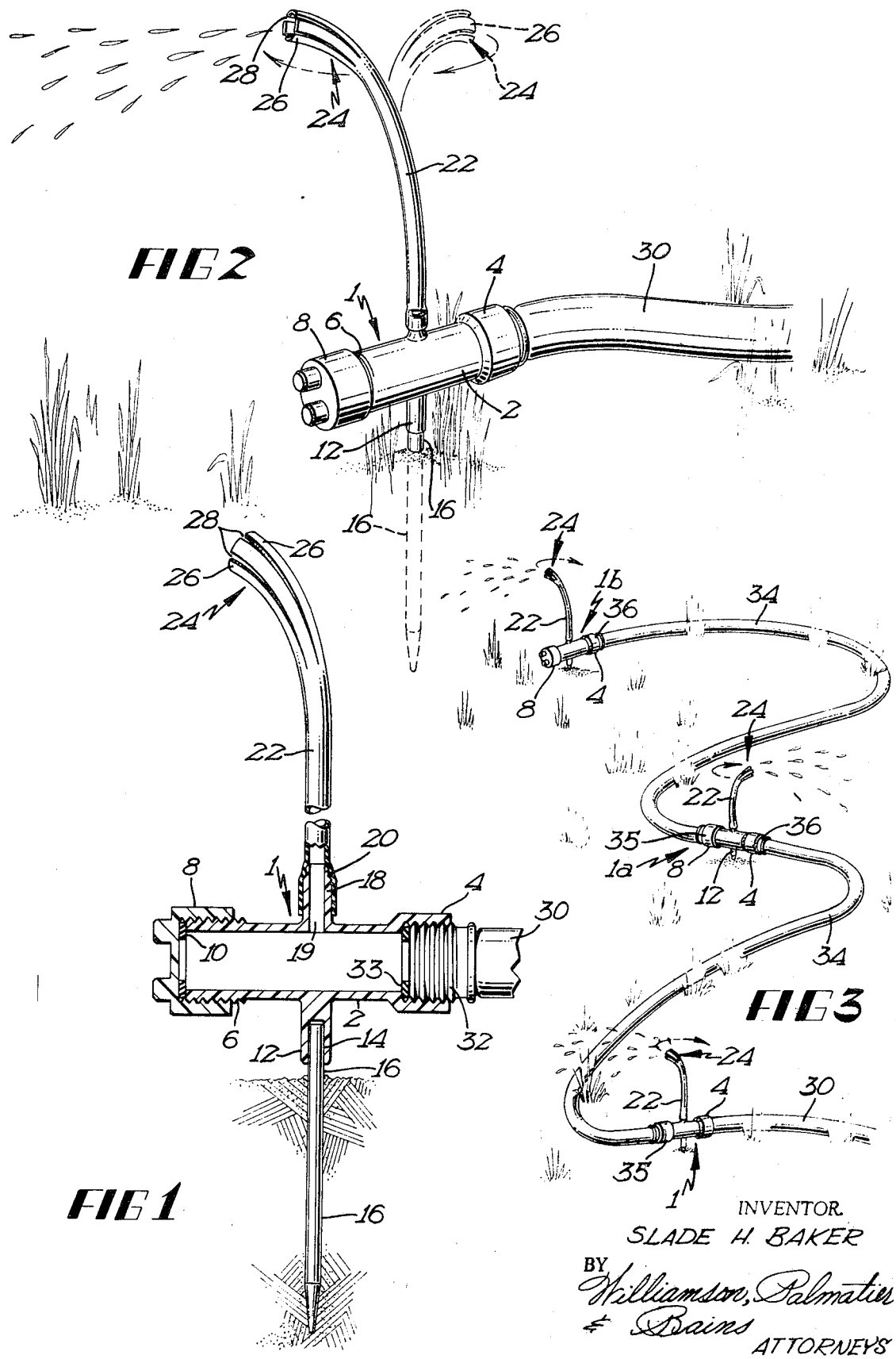

LAWN SPRINKLER

BRIEF SUMMARY OF THE INVENTION

This invention has as its basic objective the provision of a lawn sprinkler which eliminates the wear and corrosion problems associated with the moving parts of prior art devices of this type. Practically all lawn sprinklers now available have vanes, impellers or other fluid pressure-responsive moving parts for imparting rotary or oscillating movement to a sprinkler head. Such mechanical moving parts necessarily wear and eventually become partially or completely inoperative due to corrosion and resultant binding.

The lawn sprinkler of this invention is of extremely simple construction and operation, significantly evidenced by the absence of any mechanical oscillators or rotators. The sprinkler is particularly characterized by a flexible water distribution tube, preferably a short length of rubber tubing, which is attached in an upright position to an outlet on the top of a stationary, tubular body. Pressurized water introduced into the tubular body and flowing outwardly through the free end of the discharge tube causes the flexible tube to rotate about its point of attachment to the tubular body at a high rate of speed and thereby distribute water evenly over a substantially circular area.

As a particularly advantageous feature of my unique water sprinkler, the outer end of the flexible discharge tube is provided with a plurality of slits along a portion of its length, thereby forming a plurality of flexible leaves or segments which open outwardly under water pressure. Water is emitted through the enlarged longitudinal openings between the opened segments at the end of the discharge tube and is thereby broken up into very small droplets which are evenly distributed over a circular area by the rotating discharge tube.

A further beneficial feature of the lawn sprinkler of this invention resides in the use of a removable ground spike or stake to support the tubular sprinkler body in a generally horizontal position for threaded attachment at one end thereof to a garden hose. The hard, rigid tubular body is preferably molded from plastic, and an outlet fitting for the attachment of the flexible discharge tube as well as a hollow stem to removably receive the ground spike are formed integrally therewith.

As another beneficial aspect of my lawn sprinkler, I provide integrally molded, threaded connections at both ends of the tubular body so that a plurality of the sprinklers may be connected in series by separate lengths of hose for watering a large area. If only one sprinkler is used, it is closed at the end of the tubular body opposite the hose connection by a removable, threaded cap.

These and other objects and advantages of my invention will become readily apparent as the following description is read in conjunction with the accompanying drawings, wherein like reference numbers have been used to designate like elements throughout the several views.

BRIEF DESCRIPTION OF THE DRAWINGS

FIG. 1 is a vertical section view of the lawn sprinkler of this invention showing the sprinkler mounted on its ground support means;

FIG. 2 is a perspective view showing the lawn sprinkler connected to a length of hose in its operating position;

FIG. 3 is a perspective view showing a plurality of my lawn sprinklers connected in series by separate lengths of hose.

DESCRIPTION OF THE PREFERRED EMBODIMENT

The lawn sprinkler of this invention has been particularly designed with a view towards providing a sprinkler device which is characterized by ease of manufacture and operation resulting from the elimination of moving parts, and which is therefore very inexpensive. In FIGS. 1 and 2 of the drawing I have shown a preferred embodiment of my invention wherein these objectives have been realized in a very effective sprinkler. The lawn sprinkler has been generally designated by reference numeral 1, and includes as its basic structural component, an elongated, tubular body 2. At its inlet end 4, tubular body 2 is provided with internal, female threads for connection to the threaded fitting on a supply hose. Sprinkler body 2 is approximately 4 inches long, and has a normally open, externally or male threaded outlet end 6 opposite inlet end 4. Outlet end 6 of sprinkler 1 may be selectively connected to an additional length of hose in a manner hereinafter described with respect to FIG. 3, or it may be closed, if desired by a removable, threaded cap 8 as shown in FIGS. 1 and 2. Gasket 10 serves as a seal between cap 8 and the outlet end of tubular body 2.

As a mounting means for supporting sprinkler 1 on the ground, I preferably utilize a support stem 12 depending from the underside of tubular body 2 and having an elongated recess 14 extending along a portion of the length thereof within which a ground engaging stake or spike 16 is slidably and removably received in a force fit therewith. The removable attachment of ground spike 16 to support stem 12 permits sprinkler 1 to be easily and compactly packaged. In order to prepare and position sprinkler 1 for operation, the user need simply force spike 16 into recess 14 of support stem 12 and then push spike 16 down into the ground in the manner shown in FIG. 1 by grasping body 2 and forcing downwardly thereon. Recess 14 and spike 16 are sized so that spike 16 may be pushed into recess 14 and snugly held therein. For ease and economy of manufacturing; and, more importantly, in order to provide a corrosion resistant sprinkler, body 2 is molded as a unitary piece from plastic material which will be relatively hard and rigid upon setting. Recessed support stem 12, as well as the threads on inlet end 4 and outlet end 6 are molded and formed integrally with body 2. Although various plastics such as polyvinylchloride, or polyolefins may be used, I have found polypropylene to be a particularly suitable plastic for my sprinkler device. The noncorrosive characteristic of the entire sprinkler structure is maintained by also forming ground spike 16 from plastic material, nylon having been found to have the necessary strength and rigidity for this purpose.

Projecting upwardly from the top side of tubular body 2 is a discharge fitting or nipple 18 communicating at its inner end with a discharge passage 19 opening into the interior of body 2. Discharge fitting 18 is also preferably molded integrally with body 2 and includes a shoulder portion 20 at its upper end to facilitate the forcing of flexible discharge tube 22 thereover. Discharge tube 22 is made from flexible and resilient material, such as rubber, and therefore may be flexed outwardly at its lower end as it is forced onto discharge fitting 18 in tight, sealing engagement therewith as shown in FIG. 1. Packaging is further simplified by shipping discharge tube 22 and body 2 as separate pieces and leaving the user the simple task of forcing discharge tube 22 onto outlet fitting 18.

In order to improve water distribution in a manner hereinafter explained, outlet end 24 of discharge tube 22 is shredded at its outer end to form a plurality of loosely connected, flexible leaf sections 26. This is accomplished by cutting a plurality of longitudinal slits 28 in outer end 24 of tube 22. Slits 28 extend approximately 2 inches inwardly along the length of discharge tube 22, which is on the order of 8 to 10 inches long. I have found that this length of flexible distribution tube, in combination with shredded end 24 provides very effective water droplet formation and distribution with a minimum water pressure of 50 p.s.i. The best results have been obtained with a ¾-inch internal diameter for body portion 2 using a ¾-inch internal diameter supply hose to minimize pressure drop.

In operation, sprinkler 1 is attached to a length of garden hose 30 by screwing threaded, inlet end 4 of tubular body 2 onto male threads 32 on hose 30. If no additional sprinklers are to be connected downstream of the sprinkler being used, then end cap 8 is threaded onto outlet end 6 of tubular body 2 in order to seal that end of the sprinkler. With flexible discharge tube 22 affixed to discharge fitting 18, and ground spike 16 inserted within support stem 12, sprinkler 1 is firmly implanted in the ground by forcing ground spike 16 a substantial distance into the earth as shown in FIGS. 1 and 2. As pressurized water flows into tubular body 2 from supply hose 30 and out discharge passage 19 and flexible tube 22, the force of the water holds flexible tube 22 in a substantially upright sprinkling position as shown in FIGS. 1 and 2. The discharge of pressurized water from the free, outlet end 24 of discharge tube 22 causes flexible tube 22 to whip around in a rotary path at a very rapid rate, whereby a spray of water is evenly distributed over a substantially circular ground area. The pressure of the discharge water, and the centrifugal force caused by the whipping, rotary movement of discharge tube 22 causes flexible leaf sections 26 at shredded end 24 of tube 22 to be urged apart and radially outwardly, whereby slits 28 therebetween become enlarged and permit the discharge of water therethrough. As water flows outwardly through the restricted opening provided by slits 28, the water is broken up into fine droplets which are distributed over a wide arc onto the ground in a gentle, rainlike sprinkling action. The distribution of water radially outwardly from the center of sprinkler 1 along the length of slits 28 around substantially the entire circumference of shredded end 24 of flexible tube 22 provides an even distribution of fine water droplets over the ground area from sprinkler 1 outwardly to the outer perimeter of the water distribution area.

The function of shredded end 24 of flexible distribution tube 22 in breaking up the water into fine droplets is particularly important and useful towards improving water throw and distribution. The droplets which are formed by pressurized water ejection through slits 28 as the outer end 24 of flexible tube 22 whips around in an arcuate pattern will carry farther against wind and gravity than the mist type of spray generated by many sprinklers. The high speed, whipping action of flexible discharge tube 22 as it rotates under the influence of water pressure assists in providing good water throw; and the range of sprinkler 1 is further enhanced by the high velocity imparted to the water as it flows from the relatively large diameter tubular body 2 through the restricted passage offered by flexible discharge tube 22, which is on the order of one-quarter inch in internal diameter. All of these factors combine to provide extremely good water throw and distribution, which makes my improved lawn sprinkler particularly well suited for use on hillsides and terraced lawns. The water is ejected from shredded discharge end 24 of flexible tube 22 with such force and velocity that equally good water throw and distribution are obtained with sprinkler 1 oriented in any position. In other words, even with support spike 16 inserted in a hillside at an angle to the vertical with tubular body 2 oriented in an inclined position, the range of sprinkler 1 and the uniformity of water distribution in all directions will be substantially as good as when tubular body 2 is oriented in a horizontal position. Also, my particular ground support means for the sprinkler utilizing stake or spike 16 disposed at right angles to sprinkler body 2 permits the selective positioning of sprinkler body 2 with respect to the ground in order to obtain the best possible water distribution and ground coverage. Thus, if desired, sprinkler body 2 can always be maintained in a horizontal position by inserting ground stake 16 into the earth in a vertical position, regardless of the irregular contour of the terrain. This advantage is in contrast with known sprinklers which merely rest on top of the ground on a support base and are therefore necessarily canted to conform to the slope or angle of the ground contour.

The absence of any mechanical moving parts and the corrosion resistant material of which all parts of my improved sprinkler are made substantially precludes any wear, rusting or corrosion, whereby the sprinkler of this invention may be anticipated to operate indefinitely. The plastic material from which tubular body 2 is made will of course not rust or corrode, and the latex rubber utilized for flexible distribution tube 22 is resistant to practically all acids normally found in water distribution systems. As a result, there is substantially no likelihood of my sprinkler becoming plugged by corrosion buildup.

In FIG. 3 I have illustrated an arrangement wherein a plurality of my improved sprinklers are connected in series by means of intermittent lengths of hose 34 connected therebetween. The use of a number of sprinklers in this manner permits a relatively large area of ground to be sprinkled at one time. Each length or section of hose 34 is provided with a female, threaded coupling end 35 which is threadedly attached to the externally threaded outlet end 6 of each sprinkler 1; and the male, threaded coupling end 36 of each hose section 34 is attached to internally threaded inlet end 4 of each sprinkler 1, as is illustrated with respect to inlet hose section 30 in FIG. 1. A washer 33 located as shown in FIG. 1 within inlet end 4 of sprinkler body 2 serves to provide a tight seal between the sprinkler body and coupling end 36 of each hose section.

Although I have shown and described my unique lawn sprinkler with reference to a particular, preferred construction thereof, it will be appreciated that various changes can be made in the size, material and arrangement of the various parts without departing from the spirit and scope of my invention as defined by the following claims.

I claim:

1. A lawn sprinkler comprising;
  an elongate, tubular body threaded at one end thereof for removable attachment to a garden hose;
  a length of flexible discharge tube connected to the top side of said body and extending upwardly therefrom, said discharge tube being in fluid flow communication with the interior of said body by means of a discharge passage in said top side of said body, the flow of pressurized water through said flexible tube causing said tube to be held substantially upright and to rotate through an arcuate path to thereby distribute water evenly in a substantially circular area;
  a plurality of longitudinal slits in the outer end of said discharge tube, said slits defining therebetween a plurality of elongated, flexible leaf sections which spread apart under the influence of water pressure to permit water droplets to be formed and discharged therebetween; and
  ground engaging means depending from the underside of said body.

2. A lawn sprinkler as defined in claim 1 wherein:
  said ground engaging means comprises an elongated stake depending from said body.

3. A lawn sprinkler as defined in claim 2 wherein:
  said ground engaging means includes a support stem depending from the underside of said body and formed integrally therewith, said stem having a recess extending lengthwise thereof in which said ground engaging stake is slidably received in a force fit therewith.

4. A lawn sprinkler as defined in claim 1 wherein:
  said flexible discharge tube is connected to the top side of said tubular body by means of an upwardly extending discharge fitting formed integrally with said body and communicating at its inner end with said discharge passage, said flexible discharge tube being snugly fitted over said fitting in tight, sealing engagement therewith.

5. A lawn sprinkler as defined in claim 1 wherein:
  said flexible discharge tube is made of resilient material and is connected to said tubular body by being force fitted over an upwardly extending discharge nipple communicating at its inner end with said discharge passage in said top side of said tubular body, said tubular body and discharge nipple being of unitary, plastic molded construction; and
  said ground engaging means comprises a hollow stem depending downwardly from said tubular body and molded integrally therewith, and a ground engaging stake removably inserted and tightly held within said hollow stem.

6. A lawn sprinkler as defined in claim 1 wherein:
  said one end of said tubular body is provided with female threads, and the opposite end of said body is open and has male threads, thereon, whereby a plurality of said sprinklers may be connected in series by lengths of hose extending therebetween.

7. A lawn sprinkler as defined in claim 6, and further including:
a threaded cap removably secured to said opposite end of said tubular body by means of said male threads thereon, thereby closing said open, opposite end of said body when no additional length of hose is connected thereto.

8. A sprinkler device comprising:
a rigid, hollow, water receiving body having coupling means at one end thereof for removable attachment to a water conduit;
a length of flexible discharge tube connected to one side of said body and extending outwardly therefrom, said discharge tube being in fluid flow communication with the interior of said hollow body by means of a discharge passage in said one side of said body, the flow of pressurized water through said flexible tube causing said tube to rotate through an arcuate path to thereby distribute water evenly in a substantially circular area; and
a plurality of longitudinal slits in the outer end of said discharge tube, said slits defining therebetween a plurality of elongated, flexible leaf sections which spread apart under the influence of water pressure to permit water droplets to be formed and discharged therebetween.

* * * * *